US012614377B2

(12) United States Patent
Shamir

(10) Patent No.: US 12,614,377 B2
(45) Date of Patent: Apr. 28, 2026

(54) MACHINE LEARNING METHOD AND COMPUTING DEVICE FOR ART AUTHENTICATION

(71) Applicant: Kansas State University Research Foundation, Mahattan, KS (US)

(72) Inventor: Lior Shamir, Manhattan, KS (US)

(73) Assignee: Kansas State University Research Foundation

( * ) Notice: Subject to any disclaimer, the term of this patent is extended or adjusted under 35 U.S.C. 154(b) by 435 days.

(21) Appl. No.: 18/255,639

(22) PCT Filed: Dec. 2, 2021

(86) PCT No.: PCT/US2021/061539
§ 371 (c)(1),
(2) Date: Jun. 2, 2023

(87) PCT Pub. No.: WO2022/120008
PCT Pub. Date: Jun. 9, 2022

(65) Prior Publication Data
US 2024/0037914 A1 Feb. 1, 2024

Related U.S. Application Data

(60) Provisional application No. 63/120,891, filed on Dec. 3, 2020.

(51) Int. Cl.
*G06V 10/70* (2022.01)
*G06V 10/75* (2022.01)
(52) U.S. Cl.
CPC .......... *G06V 10/768* (2022.01); *G06V 10/759* (2022.01)

(58) Field of Classification Search
None
See application file for complete search history.

(56) References Cited

U.S. PATENT DOCUMENTS 9,449,253 B2 * 9/2016 Fang ..................... G06T 11/001
10,546,213 B2 * 1/2020 Scholzen ............... G06V 10/42
(Continued)

OTHER PUBLICATIONS

Shamir et al. ("Impressionism, expressionism, surrealism: Automated recognition of painters and schools of art." ACM Transactions on Applied Perception (TAP) 7.2:(2010): 1-17.) (Year: 2010).*
(Continued)

*Primary Examiner* — Anand P Bhatnagar
(74) *Attorney, Agent, or Firm* — Hovey Williams LLP

(57) ABSTRACT

A computing device to authenticate works of art comprises a processor programmed to receive test image data corresponding to an image of a test painting to be authenticated; receive a plurality of first artist image data files; receive a plurality of multiple artist image data files; generate a plurality of test painting tiles from the test image data file; generate a plurality of groups of first artist painting tiles; generate a plurality of groups of multiple artist painting tiles; train a classifier to determine one of a plurality of classes for each first artist painting tile and each multiple artist painting tile; use the trained classifier to determine the class for each test painting tile; and determine whether the test painting was likely painted by the first artist according to a percentage of the test painting tiles determined to be the class corresponding to the first artist.

30 Claims, 5 Drawing Sheets

(56) References Cited

U.S. PATENT DOCUMENTS

| | | | | |
|---|---|---|---|---|
| 11,301,704 | B2 * | 4/2022 | Yoo | G06N 3/0464 |
| 11,677,897 | B2 * | 6/2023 | Zhao | G06N 3/094 |
| | | | | 382/156 |
| 12,038,969 | B2 * | 7/2024 | Desnoyer | G06T 1/0014 |
| 2015/0310305 | A1 * | 10/2015 | Fang | G06T 11/001 |
| | | | | 345/441 |
| 2020/0151481 | A1 * | 5/2020 | Yoo | G06V 10/774 |
| 2022/0124257 | A1 * | 4/2022 | Zhao | H04N 5/265 |
| 2023/0262189 | A1 * | 8/2023 | Zhao | G06N 3/0475 |
| | | | | 382/156 |
| 2023/0265189 | A1 * | 8/2023 | Amirina | A61K 49/0058 |
| | | | | 424/9.1 |
| 2024/0161526 | A1 * | 5/2024 | McConnell | G06V 30/2253 |

OTHER PUBLICATIONS

Burcoff, A. and Shamir, L. (2017), 'Computer analysis of pablo picasso's artistic style', International Journal of Art, Culture and Design Technologies, vol. 6, No. 1, pp. 1-18.

Shamir, L. (2012), 'Computer analysis reveals similarities between the artistic styles of van Gogh and Pollock', Leonardo, vol. 45, No. 2, pp. 149-154.

Shamir, L. (2015), 'What makes a Pollock Pollock: A machine vision approach', International Journal of Arts and Technology, vol. 8, No. 1, pp. 1-10.

Shamir, L. and Tarakhovsky, J. A. (2012), 'Computer analysis of art', Journal on Computing and Cultural Heritage, vol. 5, No. 2, pp. 1-11.

Shamir, L., Nissel, J. andWinner, E. (2016), 'Distinguishing between abstract art by artists vs. children and animals: Comparison between human and machine perception', ACM Transactions on Applied Perception, vol. 13, No. 3, pp. 1-17.

* cited by examiner

COMPUTING DEVICE

| 12 | 14 | 16 |
|---|---|---|
| COMMUNICATION ELEMENT | MEMORY ELEMENT | PROCESSING ELEMENT |

10

<u>100</u>

```
┌────────────────────────────────────────────────┐
│  RECEIVE A TEST IMAGE DATA FILE INCLUDING IMAGE  │───── 101
│  DATA CORRESPONDING TO AN IMAGE OF A TEST        │
│  PAINTING TO BE AUTHENTICATED, THE TEST PAINTING │
│  THOUGHT TO BE PAINTED BY A FIRST ARTIST         │
└────────────────────────────────────────────────┘
                        │
                        ▼
┌────────────────────────────────────────────────┐
│  RECEIVE A PLURALITY OF FIRST ARTIST IMAGE DATA  │───── 102
│  FILES, EACH FIRST ARTIST IMAGE DATA FILE        │
│  INCLUDING IMAGE DATA                            │
│  CORRESPONDING TO AN IMAGE OF A SUCCESSIVE ONE   │
│  OF A PLURALITY OF FIRST ARTIST PAINTINGS, EACH  │
│  FIRST ARTIST PAINTING KNOWN TO BE PAINTED BY    │
│  THE FIRST ARTIST                                │
└────────────────────────────────────────────────┘
                        │
                        ▼
┌────────────────────────────────────────────────┐
│  RECEIVE A PLURALITY OF MULTIPLE ARTIST IMAGE    │───── 103
│  DATA FILES, EACH MULTIPLE ARTIST IMAGE DATA     │
│  FILE INCLUDING                                  │
│  IMAGE DATA CORRESPONDING TO AN IMAGE OF A       │
│  SUCCESSIVE ONE OF A PLURALITY OF MULTIPLE       │
│  ARTIST PAINTINGS, EACH MULTIPLE ARTIST PAINTING │
│  KNOWN TO BE PAINTED BY A SUCCESSIVE ONE OF A    │
│  PLURALITY OF DIFFERENT ARTISTS                  │
└────────────────────────────────────────────────┘
                        │
                        ▼
┌────────────────────────────────────────────────┐
│  GENERATE A PLURALITY OF TEST PAINTING TILES     │───── 104
│  FROM THE TEST IMAGE DATA FILE, EACH TEST        │
│  PAINTING TILE INCLUDING IMAGE DATA FOR A FIRST  │
│  NUMBER OF PIXELS                                │
└────────────────────────────────────────────────┘
                        │
                        ▼
┌────────────────────────────────────────────────┐
│  GENERATE A PLURALITY OF GROUPS OF FIRST ARTIST  │───── 105
│  PAINTING TILES, EACH GROUP FROM A SUCCESSIVE    │
│  ONE OF THE FIRST ARTIST IMAGE DATA FILES, EACH  │
│  FIRST ARTIST PAINTING TILE INCLUDING IMAGE DATA │
│  FOR THE FIRST NUMBER OF PIXELS                  │
└────────────────────────────────────────────────┘
                        │
                        ▼
┌────────────────────────────────────────────────┐
│  GENERATE A PLURALITY OF GROUPS OF MULTIPLE      │───── 106
│  ARTIST PAINTING TILES, EACH GROUP FROM A        │
│  SUCCESSIVE ONE OF THE MULTIPLE ARTIST IMAGE     │
│  DATA FILES, EACH MULTIPLE ARTIST PAINTING TILE  │
│  INCLUDING IMAGE DATA FOR THE FIRST NUMBER OF    │
│  PIXELS                                          │
└────────────────────────────────────────────────┘
                        │
                        ▼
                       (A)
```

*Fig. 3A.*

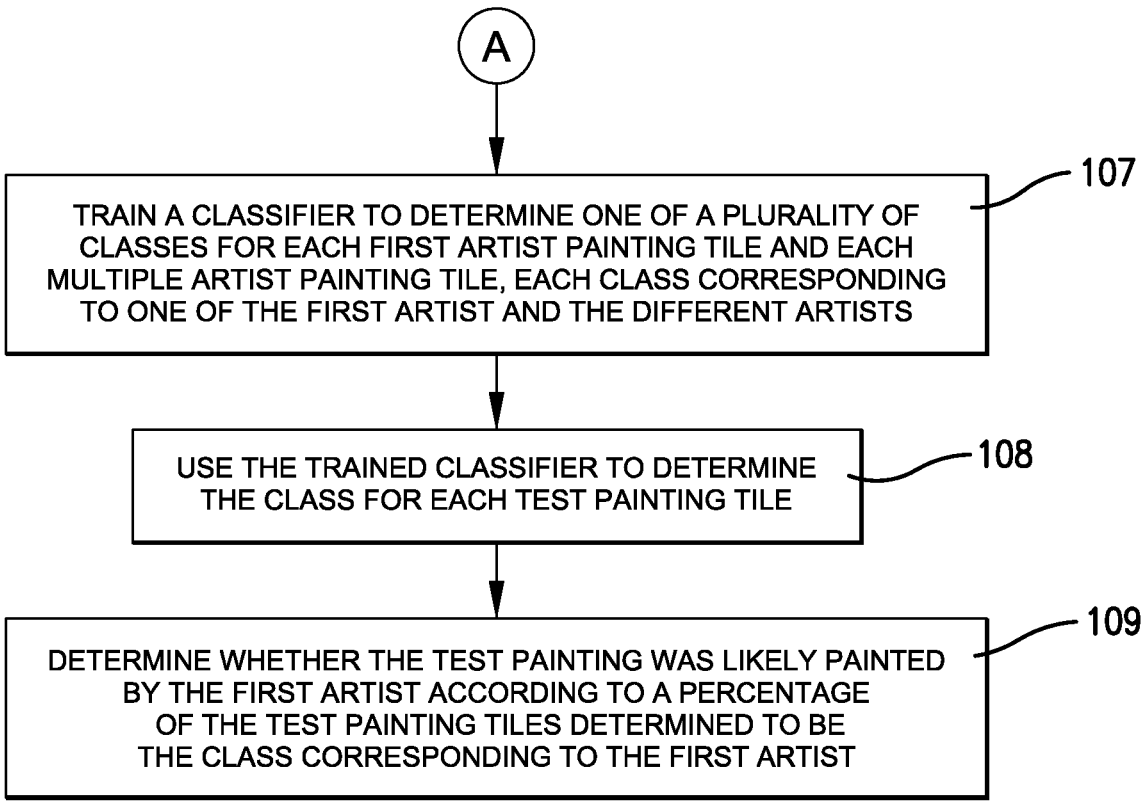

A

TRAIN A CLASSIFIER TO DETERMINE ONE OF A PLURALITY OF CLASSES FOR EACH FIRST ARTIST PAINTING TILE AND EACH MULTIPLE ARTIST PAINTING TILE, EACH CLASS CORRESPONDING TO ONE OF THE FIRST ARTIST AND THE DIFFERENT ARTISTS — 107

USE THE TRAINED CLASSIFIER TO DETERMINE THE CLASS FOR EACH TEST PAINTING TILE — 108

DETERMINE WHETHER THE TEST PAINTING WAS LIKELY PAINTED BY THE FIRST ARTIST ACCORDING TO A PERCENTAGE OF THE TEST PAINTING TILES DETERMINED TO BE THE CLASS CORRESPONDING TO THE FIRST ARTIST — 109

Figure 4A:
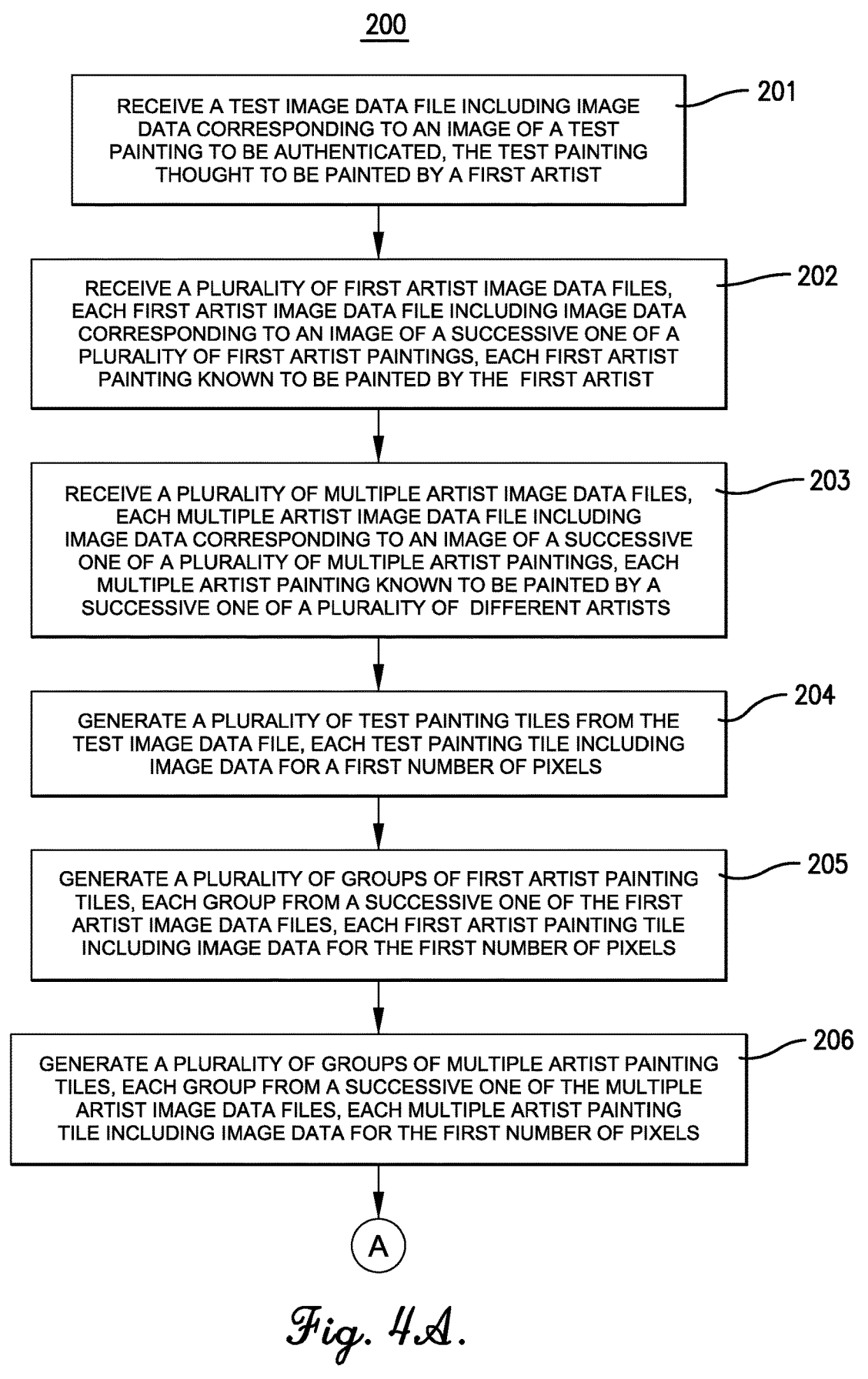

RECEIVE A TEST IMAGE DATA FILE INCLUDING IMAGE DATA CORRESPONDING TO AN IMAGE OF A TEST PAINTING TO BE AUTHENTICATED, THE TEST PAINTING THOUGHT TO BE PAINTED BY A FIRST ARTIST — 201

RECEIVE A PLURALITY OF FIRST ARTIST IMAGE DATA FILES, EACH FIRST ARTIST IMAGE DATA FILE INCLUDING IMAGE DATA CORRESPONDING TO AN IMAGE OF A SUCCESSIVE ONE OF A PLURALITY OF FIRST ARTIST PAINTINGS, EACH FIRST ARTIST PAINTING KNOWN TO BE PAINTED BY THE FIRST ARTIST — 202

RECEIVE A PLURALITY OF MULTIPLE ARTIST IMAGE DATA FILES, EACH MULTIPLE ARTIST IMAGE DATA FILE INCLUDING IMAGE DATA CORRESPONDING TO AN IMAGE OF A SUCCESSIVE ONE OF A PLURALITY OF MULTIPLE ARTIST PAINTINGS, EACH MULTIPLE ARTIST PAINTING KNOWN TO BE PAINTED BY A SUCCESSIVE ONE OF A PLURALITY OF DIFFERENT ARTISTS — 203

GENERATE A PLURALITY OF TEST PAINTING TILES FROM THE TEST IMAGE DATA FILE, EACH TEST PAINTING TILE INCLUDING IMAGE DATA FOR A FIRST NUMBER OF PIXELS — 204

GENERATE A PLURALITY OF GROUPS OF FIRST ARTIST PAINTING TILES, EACH GROUP FROM A SUCCESSIVE ONE OF THE FIRST ARTIST IMAGE DATA FILES, EACH FIRST ARTIST PAINTING TILE INCLUDING IMAGE DATA FOR THE FIRST NUMBER OF PIXELS — 205

GENERATE A PLURALITY OF GROUPS OF MULTIPLE ARTIST PAINTING TILES, EACH GROUP FROM A SUCCESSIVE ONE OF THE MULTIPLE ARTIST IMAGE DATA FILES, EACH MULTIPLE ARTIST PAINTING TILE INCLUDING IMAGE DATA FOR THE FIRST NUMBER OF PIXELS — 206

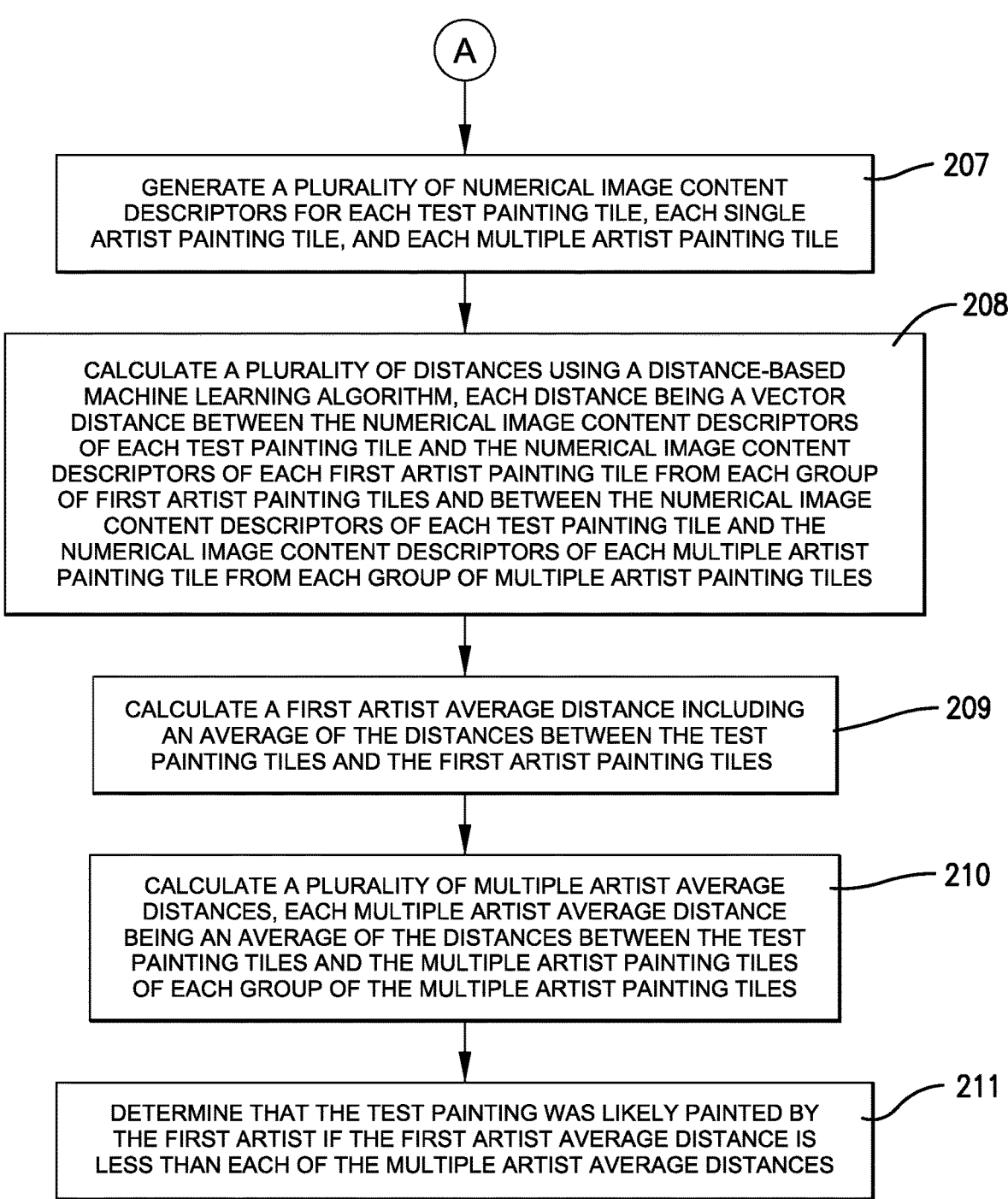

A

GENERATE A PLURALITY OF NUMERICAL IMAGE CONTENT
DESCRIPTORS FOR EACH TEST PAINTING TILE, EACH SINGLE
ARTIST PAINTING TILE, AND EACH MULTIPLE ARTIST PAINTING TILE — 207

CALCULATE A PLURALITY OF DISTANCES USING A DISTANCE-BASED
MACHINE LEARNING ALGORITHM, EACH DISTANCE BEING A VECTOR
DISTANCE BETWEEN THE NUMERICAL IMAGE CONTENT DESCRIPTORS
OF EACH TEST PAINTING TILE AND THE NUMERICAL IMAGE CONTENT
DESCRIPTORS OF EACH FIRST ARTIST PAINTING TILE FROM EACH GROUP
OF FIRST ARTIST PAINTING TILES AND BETWEEN THE NUMERICAL IMAGE
CONTENT DESCRIPTORS OF EACH TEST PAINTING TILE AND THE
NUMERICAL IMAGE CONTENT DESCRIPTORS OF EACH MULTIPLE ARTIST
PAINTING TILE FROM EACH GROUP OF MULTIPLE ARTIST PAINTING TILES — 208

CALCULATE A FIRST ARTIST AVERAGE DISTANCE INCLUDING
AN AVERAGE OF THE DISTANCES BETWEEN THE TEST
PAINTING TILES AND THE FIRST ARTIST PAINTING TILES — 209

CALCULATE A PLURALITY OF MULTIPLE ARTIST AVERAGE
DISTANCES, EACH MULTIPLE ARTIST AVERAGE DISTANCE
BEING AN AVERAGE OF THE DISTANCES BETWEEN THE TEST
PAINTING TILES AND THE MULTIPLE ARTIST PAINTING TILES
OF EACH GROUP OF THE MULTIPLE ARTIST PAINTING TILES — 210

DETERMINE THAT THE TEST PAINTING WAS LIKELY PAINTED BY
THE FIRST ARTIST IF THE FIRST ARTIST AVERAGE DISTANCE IS
LESS THAN EACH OF THE MULTIPLE ARTIST AVERAGE DISTANCES — 211

*Fig. 4B.*

MACHINE LEARNING METHOD AND COMPUTING DEVICE FOR ART AUTHENTICATION

CROSS-REFERENCE TO RELATED APPLICATIONS

The current patent application is a regular utility patent application which claims priority benefit, with regard to all common subject matter, to U.S. National Stage of International Patent Application No. PCT/US2021/61539, filed Dec. 2, 2021, which claims the benefit of U.S. Provisional Application entitled "A MACHINE LEARNING METHOD AND COMPUTING DEVICE FOR ART AUTHENTICATION", Ser. No. 63/120,891, filed Dec. 3, 2020, each of which is incorporated by reference herein in its entirety.

FIELD OF THE INVENTION

Embodiments of the current invention relate to methods and computing devices that utilize machine learning or artificial intelligence to authenticate works of art.

BACKGROUND

Authentication of a work of art, specifically a painting, involves determining the actual artist of the painting. It is necessary to have at least one artist who is thought to be the actual artist so that paintings painted by the actual artist can be collected as samples of his work. Generally, features of the painting are determined and compared with features from other paintings by the actual artist. In addition, the features of the painting are compared with features from paintings by other artists. It is then determined whether the features of the painting are more similar to the features of the paintings by the actual artist or to the features of paintings by other artists. If the features of the painting are more similar to the features of the paintings by the actual artist, then it is likely that the painting is a work of the actual artist. If not, then the painting was likely painted by someone else.

SUMMARY OF THE INVENTION

Embodiments of the current invention provide a distinct advance in the authentication of works of art by providing methods and computing devices that utilize machine learning or artificial intelligence to authenticate a test painting. The computing device comprises a processing element programed or configured to: receive a test image data file including image data corresponding to an image of a test painting to be authenticated, the test painting thought to be painted by a first artist; receive a plurality of first artist image data files, each first artist image data file including image data corresponding to an image of a successive one of a plurality of first artist paintings, each first artist painting known to be painted by the first artist; receive a plurality of multiple artist image data files, each multiple artist image data file including image data corresponding to an image of a successive one of a plurality of multiple artist paintings, each multiple artist painting known to be painted by a successive one of a plurality of different artists; generate a plurality of test painting tiles from the test image data file, each test painting tile including image data for a first number of pixels; generate a plurality of groups of first artist painting tiles, each group from a successive one of the first artist image data files, each first artist painting tile including image data for the first number of pixels; generate a plurality of groups of multiple artist painting tiles, each group from a successive one of the multiple artist image data files, each multiple artist painting tile including image data for the first number of pixels; train a classifier to determine one of a plurality of classes for each first artist painting tile and each multiple artist painting tile, each class corresponding to one of the first artist and the different artists; use the trained classifier to determine the class for each test painting tile; and determine whether the test painting was likely painted by the first artist according to a percentage of the test painting tiles determined to be the class corresponding to the first artist.

Other embodiments of the current invention provide a first computer-implemented method for utilizing machine learning to authenticate works of art. The method broadly comprises receiving a test image data file including image data corresponding to an image of a test painting to be authenticated, the test painting thought to be painted by a first artist; receiving a plurality of first artist image data files, each first artist image data file including image data corresponding to an image of a successive one of a plurality of first artist paintings, each first artist painting known to be painted by the first artist; receiving a plurality of multiple artist image data files, each multiple artist image data file including image data corresponding to an image of a successive one of a plurality of multiple artist paintings, each multiple artist painting known to be painted by a successive one of a plurality of different artists; generating a plurality of test painting tiles from the test image data file, each test painting tile including image data for a first number of pixels; generating a plurality of groups of first artist painting tiles, each group from a successive one of the first artist image data files, each first artist painting tile including image data for the first number of pixels; generating a plurality of groups of multiple artist painting tiles, each group from a successive one of the multiple artist image data files, each multiple artist painting tile including image data for the first number of pixels; training a classifier to determine one of a plurality of classes for each first artist painting tile and each multiple artist painting tile, each class corresponding to one of the first artist and the different artists; using the trained classifier to determine the class for each test painting tile; and determining whether the test painting was likely painted by the first artist according to a percentage of the test painting tiles determined to be the class corresponding to the first artist.

Yet other embodiments of the current invention provide a computing device that utilizes machine learning or artificial intelligence to authenticate a test painting. The computing device comprises a processing element programed or configured to: receive a test image data file including image data corresponding to an image of a test painting to be authenticated, the test painting thought to be painted by a first artist; receive a plurality of first artist image data files, each first artist image data file including image data corresponding to an image of a successive one of a plurality of first artist paintings, each first artist painting known to be painted by the first artist; receive a plurality of multiple artist image data files, each multiple artist image data file including image data corresponding to an image of a successive one of a plurality of multiple artist paintings, each multiple artist painting known to be painted by a successive one of a plurality of different artists; generate a plurality of test painting tiles from the test image data file, each test painting tile including image data for a first number of pixels; generate a plurality of groups of first artist painting tiles, each group from a successive one of the first artist image data files, each first artist painting tile including image data for the first number of pixels; generate a plurality of groups of multiple artist painting tiles, each group from a successive one of the multiple artist image data files, each multiple artist painting tile including image data for the first number of pixels; generate a plurality of numerical image content descriptors for each test painting tile, each single artist painting tile, and each multiple artist painting tile; calculate a plurality of distances using a distance-based machine learning algorithm, each distance being a vector distance between the numerical image content descriptors of each test painting tile and the numerical image content descriptors of each first artist painting tile from each group of first artist painting tiles and between the numerical image content descriptors of each test painting tile and the numerical image content descriptors of each multiple artist painting tile from each group of multiple artist painting tiles; calculate a first artist average distance including an average of the distances between the test painting tiles and the first artist painting tiles; calculate a plurality of multiple artist average distances, each multiple artist average distance being an average of the distances between the test painting tiles and the multiple artist painting tiles of each group of the multiple artist painting tiles; and determine that the test painting was likely painted by the first artist if the first artist average distance is less than each of the multiple artist average distances.

Still other embodiments of the current invention provide a second computer-implemented method for utilizing machine learning to authenticate works of art. The method broadly comprises receiving a test image data file including image data corresponding to an image of a test painting to be authenticated, the test painting thought to be painted by a first artist; receiving a plurality of first artist image data files, each first artist image data file including image data corresponding to an image of a successive one of a plurality of first artist paintings, each first artist painting known to be painted by the first artist; receiving a plurality of multiple artist image data files, each multiple artist image data file including image data corresponding to an image of a successive one of a plurality of multiple artist paintings, each multiple artist painting known to be painted by a successive one of a plurality of different artists; generating a plurality of test painting tiles from the test image data file, each test painting tile including image data for a first number of pixels; generating a plurality of groups of first artist painting tiles, each group from a successive one of the first artist image data files, each first artist painting tile including image data for the first number of pixels; generating a plurality of groups of multiple artist painting tiles, each group from a successive one of the multiple artist image data files, each multiple artist painting tile including image data for the first number of pixels; generating a plurality of numerical image content descriptors for each test painting tile, each single artist painting tile, and each multiple artist painting tile; calculating a plurality of distances using a distance-based machine learning algorithm, each distance being a vector distance between the numerical image content descriptors of each test painting tile and the numerical image content descriptors of each first artist painting tile from each group of first artist painting tiles and between the numerical image content descriptors of each test painting tile and the numerical image content descriptors of each multiple artist painting tile from each group of multiple artist painting tiles; calculating a first artist average distance including an average of the distances between the test painting tiles and the first artist painting tiles; calculating a plurality of multiple artist average distances, each multiple artist average distance being an average of the distances between the test painting tiles and the multiple artist painting tiles of each group of the multiple artist painting tiles; and determining that the test painting was likely painted by the first artist if the first artist average distance is less than each of the multiple artist average distances.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figures 1, 2:
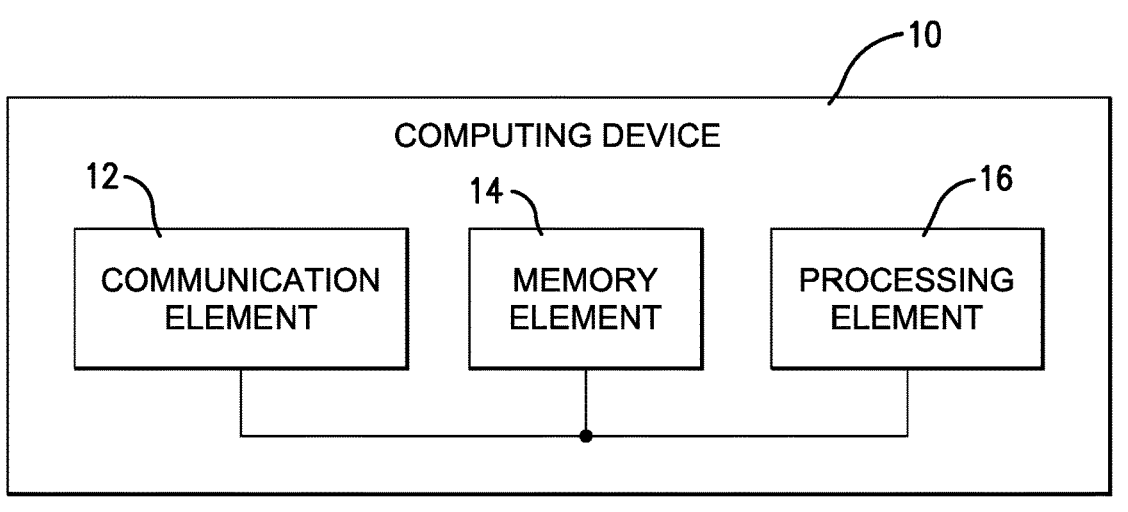
FIG. 1 is an environmental view of several embodiments of a computing device programmed and/or configured for utilizing machine learning to authenticate works of art.
FIG. 2 is a schematic block diagram of various electronic components of the computing device.

FIGS. 3A and 3B include a listing of at least a portion of the steps of a first method for utilizing machine learning to authenticate works of art; and FIGS. 4A and 4B include a listing of at least a portion of the steps of a second method for utilizing machine learning to authenticate works of art.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

A computing device 10, constructed in accordance with various embodiments of the current invention, for utilizing machine learning or artificial intelligence to authenticate works of art is shown in FIGS. 1 and 2. Specifically, the computing device 10 utilizes machine learning or artificial intelligence to determine whether a painting was painted by a particular artist.

The computing device 10 may be embodied by any one or more of the electronic devices shown in FIG. 1, such as computer servers, workstation computers, desktop computers, laptop computers, palmtop computers, notebook computers, tablets or tablet computers, smartphones, mobile phones, cellular phones, or the like. The computing device 10 broadly comprises a communication element 12, a memory element 14, and a processing element 16.

The communication element 12 generally allows the computing device 10 to communicate with other computing devices, external systems, networks, and the like. The communication element 12 may include signal and/or data transmitting and receiving circuits, such as antennas, amplifiers, filters, mixers, oscillators, digital signal processors (DSPs), and the like. The communication element 12 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the communication element 12 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 12 may establish communication through connectors or couplers that receive metal conductor wires or cables which are compatible with networking technologies such as ethernet. In certain embodiments, the communication element 12 may also couple with optical fiber cables. The communication element 12 may be in electronic communication with the memory element 14 and the processing element 16.

The memory element 14 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 14 may be embedded in, or packaged in the same package as, the processing element 16. The memory element 14 may include, or may constitute, a non-transitory "computer-readable medium". The memory element 14 may store the instructions, code, code statements, code segments, software, firmware, programs, applications, apps, services, daemons, or the like that are executed by the processing element 16. The memory element 14 may also store data that is received by the processing element 16 or the device in which the processing element 16 is implemented. The processing element 16 may further store data or intermediate results generated during processing, calculations, and/or computations as well as data or final results after processing, calculations, and/or computations. In addition, the memory element 14 may store settings, text data, documents from word processing software, spreadsheet software and other software applications, sampled audio sound files, photograph or other image data, movie data, databases, and the like.

The processing element 16 may comprise one or more processors. The processing element 16 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 16 may generally execute, process, or run instructions, code, code segments, code statements, software, firmware, programs, applications, apps, processes, services, daemons, or the like. The processing element 16 may also include hardware components such as registers, finite-state machines, sequential and combinational logic, configurable logic blocks, and other electronic circuits that can perform the functions necessary for the operation of the current invention. In certain embodiments, the processing element 16 may include multiple computational components and functional blocks that are packaged separately but function as a single unit. In some embodiments, the processing element 16 may further include multiprocessor architectures, parallel processor architectures, processor clusters, and the like, which provide high performance computing. The processing element 16 may be in electronic communication with the other electronic components through serial or parallel links that include universal busses, address busses, data busses, control lines, and the like.

The processing element 16 may be operable, configured, or programmed to perform the following functions by utilizing hardware, software, firmware, or combinations thereof. The processing element 16 receives a test image data file including image data corresponding to an image of a test painting to be authenticated, wherein the test painting is thought to be painted by a first artist. The test image data file may be created by scanning or photographing the test painting. And the image data may be created in any one of a plurality of image data formats, including joint photographic experts group (JPEG), graphics interchange format (GIF), or the like.

The processing element 16 receives a plurality of first artist image data files, with each first artist image data file including image data corresponding to an image of a successive one of a plurality of first artist paintings. Each first artist painting is known to be painted by the first artist—who also possibly painted the test painting.

The processing element 16 receives a plurality of multiple artist image data files with each multiple artist image data file including image data corresponding to an image of a successive one of a plurality of multiple artist paintings. Each multiple artist painting is known to be painted by a successive one of a plurality of different artists. Furthermore, each multiple artist painting may be of the same subject matter and in a similar style as the first artist paintings. In some cases, the multiple artist paintings may be considered to be "fakes" or copies of the first artist paintings.

All of the image data files may be received through the communication element 12 or read from a drive or port integrated with, or in communication with, the computing device 10 and are stored in the memory element 14.

The processing element 16 normalizes the test image data file, each first artist image data file, and each multiple artist image data file to include image data for a first number of pixels. For example, the processing element 16 may normalize each of the listed image data files to include image data for 1 megapixel, or a sufficient number of pixels to retain the features that are characteristic to each artist. The processing element 16 may utilize one or more techniques that convert, or transform, a larger number of pixels to a smaller number of pixels or a smaller number of pixels to a larger number of pixels. The processing element 16 also normalizes each of the listed image data files such that an aspect ratio of the test painting, each first artist painting, and each multiple artist painting is preserved.

The processing element 16 generates a plurality of test painting tiles from the test image data file, each test painting tile including image data for the first number of pixels. For example, the processing element 16 may divide the image data into a plurality of equal-sized portions, each portion being a test painting tile so that each test painting tile includes the same number of pixels. The processing element 16 may divide the image data into the test painting tiles by applying a virtual grid to the test painting. For example, the processing element 16 may apply a 2×2, or other value, virtual grid to the test painting to create four tiles, with a first tile corresponding to an upper-right quadrant, a second tile corresponding to an upper-left quadrant, a third tile corresponding to a lower-left quadrant, and a fourth tile corresponding to lower-right quadrant.

The processing element 16 generates a plurality of groups of first artist painting tiles, with each group being generated from a successive one of the first artist image data files. For example, the processing element 16 may generate a first group of first artist painting tiles from a first artist image data file, a second group of first artist painting tiles from a second first artist image data file, and so forth. Each first artist painting tile from a particular group includes image data for the first number of pixels. In addition, the processing element 16 may divide the image data from each of the first artist image data files into first artist painting tiles by applying a virtual grid to the first artist paintings, as described above for the test painting.

The processing element 16 generates a plurality of groups of multiple artist painting tiles, with each group being generated from a successive one of the multiple artist image data files. For example, the processing element 16 may generate a first group of multiple artist painting tiles from a first multiple artist image data file, a second group of multiple artist painting tiles from a second multiple artist image data file, and so forth. Each multiple artist painting tile from a particular group includes image data for the first number of pixels. In addition, the processing element 16 may divide the image data from each of the multiple artist image data files into multiple artist painting tiles by applying a virtual grid to the multiple artist paintings, as described above for the test painting.

The processing element 16 generates a plurality of numerical image content descriptors for each test painting tile, each single artist painting tile, and each multiple artist painting tile. The processing element 16 executes a plurality of image data analysis algorithms to generate the numerical image content descriptors, wherein each image data analysis algorithm generates at least a portion of the numerical image content descriptors. Examples of the image data analysis algorithms include UDAT and WND-CHARM, among others. Furthermore, in some cases, the image data analysis algorithms are executed with the image data as inputs. In other cases, the image data is transformed using transforms, such as a Fourier transform, a Chebyshev transform, a Wavelet (symlet 5, level 1) transform, a color transform, and the like, and combinations thereof, and the image data analysis algorithms are executed with the transformed data as inputs. The descriptors include Gabor, Tamura, and Haralick, color features, edge statistics, objects statistics, Radon transform, distribution of pixel intensity values, multi-scale histograms, Chebyshev statistics, Zernike polynomials, fractal features, image entropy, and so forth. The descriptors may also include the Gini coefficient, adopted from the field of economy to measure the distribution of light in an image, wherein the Gini coefficient is measured as the area under the curve of the histogram of pixel intensities, which reflects the inequality of the intensities.

Each numerical image content descriptor is a number. In various embodiments, the processing element 16 may concatenate, compress, encode, or the like a plurality of numerical image content descriptors for each painting tile to form one or more vectors for the painting tile.

The processing element 16 trains a classifier to determine one of a plurality of classes for each first artist painting tile and each multiple artist painting tile, each class corresponding to one of the first artist and the different artists. The classifier may include machine learning classifiers such as support vector machines (SVM), random forest classifiers, and the like, or combinations thereof. The processing element 16 utilizes the numerical image content descriptors or vectors for each first artist painting tile and each multiple artist painting tile to train the classifier. The numerical image content descriptors or vectors for each first artist painting tile are utilized as an example of the class of the first artist, which may be considered the first class. The numerical image content descriptors or vectors for each group of multiple artist painting tiles are utilized as an example of the class of the artist associated with the group. For example, a first group of multiple artist painting tiles may be associated with a first one of the multiple artists and those painting tiles are utilized to teach the classifier to classify the painting tiles as a second class (with the first artist being associated with the first class). A second group of multiple artist painting tiles may be associated with a second one of the multiple artists and those painting tiles are utilized to teach the classifier to classify the painting tiles as a third class, and so forth with the rest of the multiple artists.

The processing element 16 uses the trained classifier to determine the class for each test painting tile. The processing element 16 uses the numerical image content descriptors or vectors for each of the test painting tiles as inputs to the trained classifier. For each of the test painting tiles, the classifier determines the tile to belong to one of the classes, wherein each class is associated with the first artist or a successive one of the multiple artists.

The processing element 16 determines whether the test painting was likely painted by the first artist according to a percentage of the test painting tiles determined to be the class corresponding to the first artist. For example, if the first class is associated with the first artist and the processing element 16 determines that more than 50% of the test painting tiles belong to the first class, then it is likely that the test painting is authentic and was painted by the first artist. Generally, the higher the percentage of test painting tiles determined to belong to the first class, the greater the likelihood that the test painting was painted by the first artist. It is also possible that the test painting was painted by one of the multiple artists if the majority of the test painting tiles are determined to belong to one of the classes associated with the one of the multiple artists.

FIGS. 3A and 3B depict a listing of at least a portion of the steps of an exemplary computer-implemented method 100 for utilizing machine learning to authenticate works of art. The steps may be performed in the order shown in FIGS. 3A and 3B, or they may be performed in a different order. Furthermore, some steps may be performed concurrently as opposed to sequentially. In addition, some steps may be optional or may not be performed. The steps may be performed by the processing element 16 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 14.

Referring to step 101, a test image data file is received that includes image data corresponding to an image of a test painting to be authenticated. The test painting is thought to be painted by a first artist. The test image data file may be created by scanning or photographing the test painting. And the image data may be created in any one of a plurality of image data formats, including joint photographic experts group (JPEG), graphics interchange format (GIF), or the like.

Referring to step 102, a plurality of first artist image data files is received. Each first artist image data file includes image data corresponding to an image of a successive one of a plurality of first artist paintings. Each first artist painting is known to be painted by the first artist—who also possibly painted the test painting.

Referring to step 103, a plurality of multiple artist image data files is received. Each multiple artist image data file includes image data corresponding to an image of a successive one of a plurality of multiple artist paintings. Each multiple artist painting is known to be painted by a successive one of a plurality of different artists. Furthermore, each multiple artist painting may be of the same subject matter and in a similar style as the first artist paintings. In some cases, the multiple artist paintings may be considered to be "fakes" or copies of the first artist paintings.

In addition, the test image data file is normalized, with each first artist image data file, and each multiple artist image data file including image data for a first number of pixels. For example, each of the listed image data files may be normalized to include image data for 1 megapixel, or a sufficient number of pixels to retain the features that are characteristic to each artist. One or more techniques may be utilized that convert, or transform, a larger number of pixels to a smaller number of pixels or a smaller number of pixels to a larger number of pixels. Each of the listed image data files are also normalized such that an aspect ratio of the test painting, each first artist painting, and each multiple artist painting is preserved.

Referring to step 104, a plurality of test painting tiles from the test image data file is generated. Each test painting tile includes image data for the first number of pixels. For example, the image data may be divided into a plurality of equal-sized portions, each portion being a test painting tile so that each test painting tile includes the same number of pixels. The image data may be divided into the test painting tiles by applying a virtual grid to the test painting. For example, a 2×2, or other value, virtual grid may be applied to the test painting to create four tiles, with a first tile corresponding to an upper-right quadrant, a second tile corresponding to an upper-left quadrant, a third tile corresponding to a lower-left quadrant, and a fourth tile corresponding to lower-right quadrant.

Referring to step 105, a plurality of groups of first artist painting tiles is generated. Each group is generated from a successive one of the first artist image data files. For example, a first group of first artist painting tiles may be generated from a first artist image data file, a second group of first artist painting tiles may be generated from a second first artist image data file, and so forth. Each first artist painting tile including image data for the first number of pixels. In addition, the image data from each of the first artist image data files may be divided into first artist painting tiles by applying a virtual grid to the first artist paintings, as described above for the test painting.

Referring to step 106, a plurality of groups of multiple artist painting tiles is generated. Each group is generated from a successive one of the multiple artist image data files. For example, a first group of multiple artist painting tiles may be generated from a first multiple artist image data file, a second group of multiple artist painting tiles may be generated from a second multiple artist image data file, and so forth. Each multiple artist painting tile from a particular group includes image data for the first number of pixels. In addition, the image data from each of the multiple artist image data files may be divided into multiple artist painting tiles by applying a virtual grid to the multiple artist paintings, as described above for the test painting.

In addition, a plurality of numerical image content descriptors is generated for each test painting tile, each single artist painting tile, and each multiple artist painting tile. A plurality of image data analysis algorithms is executed to generate the numerical image content descriptors, wherein each image data analysis algorithm generates at least a portion of the numerical image content descriptors. Examples of the image data analysis algorithms include UDAT and WND-CHARM, among others. Furthermore, in some cases, the image data analysis algorithms are executed with the image data as inputs. In other cases, the image data is transformed using transforms, such as a Fourier transform, a Chebyshev transform, a Wavelet (symlet 5, level 1) transform, a color transform, and the like, and combinations thereof, and the image data analysis algorithms are executed with the transformed data as inputs. The descriptors include Gabor, Tamura, and Haralick, color features, edge statistics, objects statistics, Radon transform, distribution of pixel intensity values, multi-scale histograms, Chebyshev statistics, Zernike polynomials, fractal features, image entropy, and so forth. The descriptors may also include the Gini coefficient, adopted from the field of economy to measure the distribution of light in an image, wherein the Gini coefficient is measured as the area under the curve of the histogram of pixel intensities, which reflects the inequality of the intensities.

Each numerical image content descriptor is a number. In various embodiments, a plurality of numerical image content descriptors is concatenated, compressed, encoded, or the like for each painting tile to form one or more vectors for the painting tile.

Referring to step 107, a classifier is trained to determine one of a plurality of classes for each first artist painting tile and each multiple artist painting tile. Each class corresponds to one of the first artist and the different artists. The classifier may include machine learning classifiers such as support vector machines (SVM), random forest classifiers, and the like, or combinations thereof. The numerical image content descriptors or vectors are utilized for each first artist painting tile and each multiple artist painting tile to train the classifier. The numerical image content descriptors or vectors for each first artist painting tile are utilized as an example of the class of the first artist, which may be considered the first class. The numerical image content descriptors or vectors for each group of multiple artist painting tiles are utilized as an example of the class of the artist associated with the group. For example, a first group of multiple artist painting tiles may be associated with a first one of the multiple artists and those painting tiles are utilized to teach the classifier to classify the painting tiles as a second class (with the first artist being associated with the first class). A second group of multiple artist painting tiles may be associated with a second one of the multiple artists and those painting tiles are utilized to teach the classifier to classify the painting tiles as a third class, and so forth with the rest of the multiple artists.

Referring to step 108, the trained classifier is used to determine the class for each test painting tile. The numerical image content descriptors or vectors for each of the test painting tiles are used as inputs to the trained classifier. For each of the test painting tiles, the classifier determines the tile to belong to one of the classes, wherein each class is associated with the first artist or a successive one of the multiple artists.

Referring to step 109, it is determined whether the test painting was likely painted by the first artist according to a percentage of the test painting tiles determined to be the class corresponding to the first artist. For example, if the first class is associated with the first artist and it is determined that more than 50% of the test painting tiles belong to the first class, then it is likely that the test painting is authentic and was painted by the first artist. Generally, the higher the percentage of test painting tiles determined to belong to the first class, the greater the likelihood that the test painting was painted by the first artist. It is also possible that the test painting was painted by one of the multiple artists if the majority of the test painting tiles are determined to belong to one of the classes associated with the one of the multiple artists.

In another embodiment, the processing element 16 receives the test image data file, the first artist image data files, and the multiple artist data files as described above. The processing element 16 normalizes the test image data file, each first artist image data file, and each multiple artist image data file as described above. The processing element 16 generates the test painting tiles, the groups of first artist painting tiles, and the groups of multiple artist painting tiles as described above. The processing element 16 generates the numerical image content descriptors for each test painting tile, each single artist painting tile, and each multiple artist painting tile as described above. In addition, the processing element 16 may concatenate, compress, encode, or the like a plurality of numerical image content descriptors for each painting tile to form one or more vectors for the painting tile.

The processing element 16 calculates a plurality of distances using a distance-based machine learning algorithm with each distance being a vector distance. The processing element 16 calculates the distances between the test painting tiles and the first artist painting tiles wherein a distance is calculated from each test painting tile to a successive one of the first artist painting tiles. For example, if there are 4 test painting tiles and 2 groups of first artist painting tiles, each with 4 first artist painting tiles, then the processing element 16 calculates 16 distances between the test painting tiles and the first group of first artist painting tiles and 16 distances between the test painting tiles and the second group of first artist painting tiles for a total of 32 distances. The processing element 16 also calculates the distances between the test painting tiles and the multiple artist painting tiles wherein a distance is calculated from each test painting tile to a successive one of the multiple artist painting tiles. For example, if there are 4 test painting tiles and 4 groups of multiple artist painting tiles, each with 4 multiple artist painting tiles, then the processing element 16 calculates 16 distances between the test painting tiles and each group of multiple artist painting tiles for a total of 64 distances.

The distance between any two painting tiles is a measure of the similarity of the features of the two painting tiles— which also may be thought of as a similarity in the painting style of the artists who painted the paintings from which the painting tiles were derived. There is an inverse relationship between the distance and the similarity so that generally, the smaller the distance, the greater the similarity.

The processing element 16 calculates a first artist average distance as an average or a statistical mean of the distances between the test painting tiles and the first artist painting tiles. Continuing from the example above, the processing element 16 calculates the first artist average distance as the average of the 32 distances between the test painting tiles and the first artist painting tiles.

The processing element 16 calculates a plurality of multiple artist average distances. The processing element 16 calculates each multiple artist average distance as the average or the statistical mean of the distances between the test painting tiles and the multiple artist painting tiles for a successive one of the groups of multiple artist painting tiles. Continuing from the example above, the processing element 16 calculates a first multiple artist average distance as the average of the distances between the test painting tiles and the first group of multiple artist painting tiles, a second multiple artist average distance as the average of the distances between the test painting tiles and the second group of multiple artist painting tiles, a third multiple artist average distance as the average of the distances between the test painting tiles and the third group of multiple artist painting tiles, a fourth multiple artist average distance as the average of the distances between the test painting tiles and the fourth group of multiple artist painting tiles.

The processing element 16 determines that the test painting was likely painted by the first artist if the first artist average distance is less than each of the multiple artist average distances. The processing element 16 compares the first artist average distance to each of the multiple artist average distances to determine whether the first artist average distance is less than the multiple artist average distances. If the first artist average distance is less than each of the multiple artist average distances, then it is likely that the test painting is authenticate. If the first artist average distance is greater than or equal to any of the multiple artist average distances, then it is likely that the test painting is a fake.

FIGS. 4A and 4B depict a listing of at least a portion of the steps of an exemplary computer-implemented method 200 for utilizing machine learning to authenticate works of art. The steps may be performed in the order shown in FIGS. 4A and 4B, or they may be performed in a different order. Furthermore, some steps may be performed concurrently as opposed to sequentially. In addition, some steps may be optional or may not be performed. The steps may be performed by the processing element 16 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 12.

Referring to step 201, a test image data file is received that includes image data corresponding to an image of a test painting to be authenticated. The test painting is thought to be painted by a first artist. The test image data file may be created by scanning or photographing the test painting. And the image data may be created in any one of a plurality of image data formats, including joint photographic experts group (JPEG), graphics interchange format (GIF), or the like.

Referring to step 202, a plurality of first artist image data files is received. Each first artist image data file includes image data corresponding to an image of a successive one of a plurality of first artist paintings. Each first artist painting is known to be painted by the first artist—who also possibly painted the test painting.

Referring to step 203, a plurality of multiple artist image data files is received. Each multiple artist image data file includes image data corresponding to an image of a successive one of a plurality of multiple artist paintings. Each multiple artist painting is known to be painted by a successive one of a plurality of different artists. Furthermore, each multiple artist painting may be of the same subject matter and in a similar style as the first artist paintings. In some cases, the multiple artist paintings may be considered to be "fakes" or copies of the first artist paintings.

In addition, the test image data file is normalized, with each first artist image data file, and each multiple artist image data file including image data for a first number of pixels. For example, each of the listed image data files may be normalized to include image data for 1 megapixel, or a sufficient number of pixels to retain the features that are characteristic to each artist. One or more techniques may be utilized that convert, or transform, a larger number of pixels to a smaller number of pixels or a smaller number of pixels to a larger number of pixels. Each of the listed image data files are also normalized such that an aspect ratio of the test painting, each first artist painting, and each multiple artist painting is preserved.

Referring to step 204, a plurality of test painting tiles from the test image data file is generated. Each test painting tile includes image data for the first number of pixels. For example, the image data may be divided into a plurality of equal-sized portions, each portion being a test painting tile so that each test painting tile includes the same number of pixels. The image data may be divided into the test painting tiles by applying a virtual grid to the test painting. For example, a 2×2, or other value, virtual grid may be applied to the test painting to create four tiles, with a first tile corresponding to an upper-right quadrant, a second tile corresponding to an upper-left quadrant, a third tile corresponding to a lower-left quadrant, and a fourth tile corresponding to lower-right quadrant.

Referring to step 205, a plurality of groups of first artist painting tiles is generated. Each group is generated from a successive one of the first artist image data files. For example, a first group of first artist painting tiles may be generated from a first artist image data file, a second group of first artist painting tiles may be generated from a second first artist image data file, and so forth. Each first artist painting tile including image data for the first number of pixels. In addition, the image data from each of the first artist image data files may be divided into first artist painting tiles by applying a virtual grid to the first artist paintings, as described above for the test painting.

Referring to step 206, a plurality of groups of multiple artist painting tiles is generated. Each group is generated from a successive one of the multiple artist image data files. For example, a first group of multiple artist painting tiles may be generated from a first multiple artist image data file, a second group of multiple artist painting tiles may be generated from a second multiple artist image data file, and so forth. Each multiple artist painting tile from a particular group includes image data for the first number of pixels. In addition, the image data from each of the multiple artist image data files may be divided into multiple artist painting tiles by applying a virtual grid to the multiple artist paintings, as described above for the test painting.

Referring to step 207, a plurality of numerical image content descriptors is generated for each test painting tile, each single artist painting tile, and each multiple artist painting tile. A plurality of image data analysis algorithms is executed to generate the numerical image content descriptors, wherein each image data analysis algorithm generates at least a portion of the numerical image content descriptors. Examples of the image data analysis algorithms include UDAT and WND-CHARM, among others. Furthermore, in some cases, the image data analysis algorithms are executed with the image data as inputs. In other cases, the image data is transformed using transforms, such as a Fourier transform, a Chebyshev transform, a Wavelet (symlet 5, level 1) transform, a color transform, and the like, and combinations thereof, and the image data analysis algorithms are executed with the transformed data as inputs. The descriptors include Gabor, Tamura, and Haralick, color features, edge statistics, objects statistics, Radon transform, distribution of pixel intensity values, multi-scale histograms, Chebyshev statistics, Zernike polynomials, fractal features, image entropy, and so forth. The descriptors may also include the Gini coefficient, adopted from the field of economy to measure the distribution of light in an image, wherein the Gini coefficient is measured as the area under the curve of the histogram of pixel intensities, which reflects the inequality of the intensities.

Each numerical image content descriptor is a number. In various embodiments, a plurality of numerical image content descriptors is concatenated, compressed, encoded, or the like for each painting tile to form one or more vectors for the painting tile.

Referring to step 208, a plurality of distances is calculated using a distance-based machine learning algorithm. Each distance is a vector distance. The distances between the test painting tiles and the first artist painting tiles are calculated wherein a distance is calculated from each test painting tile to a successive one of the first artist painting tiles. For example, if there are 4 test painting tiles and 2 groups of first artist painting tiles, each with 4 first artist painting tiles, then 16 distances between the test painting tiles and the first group of first artist painting tiles are calculated and 16 distances between the test painting tiles and the second group of first artist painting tiles are calculated for a total of 32 distances. The distances between the test painting tiles and the multiple artist painting tiles are also calculated wherein a distance is calculated from each test painting tile to a successive one of the multiple artist painting tiles. For example, if there are 4 test painting tiles and 4 groups of multiple artist painting tiles, each with 4 multiple artist painting tiles, then 16 distances between the test painting tiles and each group of multiple artist painting tiles are calculated for a total of 64 distances.

The distance between any two painting tiles is a measure of the similarity of the features of the two painting tiles—which also may be thought of as a similarity in the painting style of the artists who painted the paintings from which the painting tiles were derived. There is an inverse relationship between the distance and the similarity so that generally, the smaller the distance, the greater the similarity.

Referring to step 209, a first artist average distance is calculated as an average or a statistical mean of the distances between the test painting tiles and the first artist painting tiles. Continuing from the example above, the first artist average distance is calculated as the average of the 32 distances between the test painting tiles and the first artist painting tiles.

Referring to step 210, a plurality of multiple artist average distances is calculated, with each multiple artist average distance being calculated as the average or the statistical mean of the distances between the test painting tiles and the multiple artist painting tiles for a successive one of the groups of multiple artist painting tiles. Continuing from the example above, a first multiple artist average distance is calculated as the average of the distances between the test painting tiles and the first group of multiple artist painting tiles, a second multiple artist average distance as the average of the distances between the test painting tiles and the second group of multiple artist painting tiles, a third multiple artist average distance as the average of the distances between the test painting tiles and the third group of multiple artist painting tiles, a fourth multiple artist average distance as the average of the distances between the test painting tiles and the fourth group of multiple artist painting tiles.

Referring to step 211, it is determined that the test painting was likely painted by the first artist if the first artist average distance is less than each of the multiple artist average distances. The first artist average distance is compared to each of the multiple artist average distances to determine whether the first artist average distance is less than the multiple artist average distances. If the first artist average distance is less than each of the multiple artist average distances, then it is likely that the test painting is authenticate. If the first artist average distance is greater than or equal to any of the multiple artist average distances, then it is likely that the test painting is a fake.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A computing device for utilizing machine learning to authenticate works of art, the computing device comprising:
    a processing element programmed or configured to:
        receive a test image data file including image data corresponding to an image of a test painting to be authenticated, the test painting thought to be painted by a first artist;
        receive a plurality of first artist image data files, each first artist image data file including image data corresponding to an image of a successive one of a plurality of first artist paintings, each first artist painting known to be painted by the first artist;
        receive a plurality of multiple artist image data files, each multiple artist image data file including image data corresponding to an image of a successive one of a plurality of multiple artist paintings, each multiple artist painting known to be painted by a successive one of a plurality of different artists;
        generate a plurality of test painting tiles from the test image data file, each test painting tile including image data for a first number of pixels;
        generate a plurality of groups of first artist painting tiles, each group from a successive one of the first artist image data files, each first artist painting tile including image data for the first number of pixels;
        generate a plurality of groups of multiple artist painting tiles, each group from a successive one of the multiple artist image data files, each multiple artist painting tile including image data for the first number of pixels;
        train a classifier to determine one of a plurality of classes for each first artist painting tile and each multiple artist painting tile, each class corresponding to one of the first artist and the different artists;
        use the trained classifier to determine the class for each test painting tile; and
        determine whether the test painting was likely painted by the first artist according to a percentage of the test painting tiles determined to be the class corresponding to the first artist.

2. The computing device of claim 1, wherein the processing element is further programmed or configured to normalize the test image data file, each first artist image data file, and each multiple artist image data file to include image data for a first number of pixels, such that an aspect ratio of the test painting, each first artist painting, and each multiple artist painting is preserved.

3. The computing device of claim 1, wherein the processing element is further programmed or configured to generate a plurality of numerical image content descriptors for each test painting tile, each single artist painting tile, and each multiple artist painting tile, the numerical image content descriptors generated by at least one of UDAT and WND-CHARM, such that the classifier is trained using the numerical image content descriptors from the single artist painting tiles and the multiple artist painting tiles as inputs.

4. The computing device of claim 3, wherein the numerical image content descriptors for the test painting tiles are used as inputs to the trained classifier to determine the class for each test painting tile.

5. The computing device of claim 3, wherein the processing element is further programmed or configured to execute a plurality of image data analysis algorithms when generating the numerical image content descriptors such that each image data analysis algorithm generates at least a portion of the numerical image content descriptors.

6. The computing device of claim 1, wherein each test painting tile corresponds to a successive one of plurality of areas of the test painting.

7. The computing device of claim 1, wherein each group of first artist painting tiles correspond to a successive one of the first artist paintings and each first artist painting tile within the group corresponds to a successive one of plurality of areas of the corresponding first artist painting.

8. The computing device of claim 1, wherein each group of multiple artist painting tiles correspond to a successive one of the multiple artist paintings and each multiple artist painting tile within the group corresponds to a successive one of plurality of areas of the corresponding multiple artist painting.

9. The computing device of claim 1, wherein the processing element is further programmed or configured to determine that the test painting was likely painted by the first artist if greater than 50% of the test painting tiles are determined to be in the class corresponding to the first artist.

10. A computer-implemented method for utilizing machine learning to authenticate works of art, the method comprising:

receiving a test image data file including image data corresponding to an image of a test painting to be authenticated, the test painting thought to be painted by a first artist;

receiving a plurality of first artist image data files, each first artist image data file including image data corresponding to an image of a successive one of a plurality of first artist paintings, each first artist painting known to be painted by the first artist;

receiving a plurality of multiple artist image data files, each multiple artist image data file including image data corresponding to an image of a successive one of a plurality of multiple artist paintings, each multiple artist painting known to be painted by a successive one of a plurality of different artists;

generating a plurality of test painting tiles from the test image data file, each test painting tile including image data for a first number of pixels;

generating a plurality of groups of first artist painting tiles, each group from a successive one of the first artist image data files, each first artist painting tile including image data for the first number of pixels;

generating a plurality of groups of multiple artist painting tiles, each group from a successive one of the multiple artist image data files, each multiple artist painting tile including image data for the first number of pixels;

training a classifier to determine one of a plurality of classes for each first artist painting tile and each multiple artist painting tile, each class corresponding to one of the first artist and the different artists;

using the trained classifier to determine the class for each test painting tile; and determining whether the test painting was likely painted by the first artist according to a percentage of the test painting tiles determined to be the class corresponding to the first artist.

11. The computer-implemented method of claim 10, further comprising normalizing the test image data file, each first artist image data file, and each multiple artist image data file to include image data for a first number of pixels, such that an aspect ratio of the test painting, each first artist painting, and each multiple artist painting is preserved.

12. The computer-implemented method of claim 10, further comprising generating a plurality of numerical image content descriptors for each test painting tile, each single artist painting tile, and each multiple artist painting tile, the numerical image content descriptors generated by at least one of UDAT and WND-CHARM, such that the classifier is trained using the numerical image content descriptors from the single artist painting tiles and the multiple artist painting tiles as inputs.

13. The computer-implemented method of claim 12, wherein the numerical image content descriptors for the test painting tiles are used as inputs to the trained classifier to determine the class for each test painting tile.

14. The computer-implemented method of claim 12, further comprising executing a plurality of image data analysis algorithms when generating the numerical image content descriptors such that each image data analysis algorithm generates at least a portion of the numerical image content descriptors.

15. The computer-implemented method of claim 10, wherein each test painting tile corresponds to a successive one of plurality of areas of the test painting.

16. The computer-implemented method of claim 10, wherein each group of first artist painting tiles correspond to a successive one of the first artist paintings and each first artist painting tile within the group corresponds to a successive one of plurality of areas of the corresponding first artist painting.

17. The computer-implemented method of claim 10, wherein each group of multiple artist painting tiles correspond to a successive one of the multiple artist paintings and each multiple artist painting tile within the group corresponds to a successive one of plurality of areas of the corresponding multiple artist painting.

18. The computer-implemented method of claim 10, further comprising determining that the test painting was likely painted by the first artist if greater than 50% of the test painting tiles are determined to be in the class corresponding to the first artist.

19. A computing device for utilizing machine learning to authenticate works of art, the computing device comprising:

a processing element programmed or configured to:

receive a test image data file including image data corresponding to an image of a test painting to be authenticated, the test painting thought to be painted by a first artist;

receive a plurality of first artist image data files, each first artist image data file including image data corresponding to an image of a successive one of a plurality of first artist paintings, each first artist painting known to be painted by the first artist;

receive a plurality of multiple artist image data files, each multiple artist image data file including image data corresponding to an image of a successive one of a plurality of multiple artist paintings, each multiple artist painting known to be painted by a successive one of a plurality of different artists;

generate a plurality of test painting tiles from the test image data file, each test painting tile including image data for a first number of pixels;

generate a plurality of groups of first artist painting tiles, each group from a successive one of the first artist image data files, each first artist painting tile including image data for the first number of pixels;

generate a plurality of groups of multiple artist painting tiles, each group from a successive one of the multiple artist image data files, each multiple artist painting tile including image data for the first number of pixels;

generate a plurality of numerical image content descriptors for each test painting tile, each single artist painting tile, and each multiple artist painting tile, the numerical image content descriptors generated by at least one of UDAT and WND-CHARM;

calculate a plurality of distances using a distance-based machine learning algorithm, each distance being a vector distance between the numerical image content descriptors of each test painting tile and the numerical image content descriptors of each first artist painting tile from each group of first artist painting tiles and between the numerical image content descriptors of each test painting tile and the numerical image content descriptors of each multiple artist painting tile from each group of multiple artist painting tiles;

calculate a first artist average distance including an average of the distances between the test painting tiles and the first artist painting tiles;

calculate a plurality of multiple artist average distances, each multiple artist average distance being an average of the distances between the test painting tiles and the multiple artist painting tiles of each group of the multiple artist painting tiles; and determine that the test painting was likely painted by the first artist if the first artist average distance is less than each of the multiple artist average distances.

20. The computing device of claim 19, wherein the processing element is further programmed or configured to normalize the test image data file, each first artist image data file, and each multiple artist image data file to include image data for a first number of pixels, such that an aspect ratio of the test painting, each first artist painting, and each multiple artist painting is preserved.

21. The computing device of claim 19, wherein the processing element is further programmed or configured to execute a plurality of image data analysis algorithms when generating the numerical image content descriptors such that each image data analysis algorithm generates at least a portion of the numerical image content descriptors.

22. The computing device of claim 19, wherein each test painting tile corresponds to a successive one of plurality of areas of the test painting.

23. The computing device of claim 19, wherein each group of first artist painting tiles correspond to a successive one of the first artist paintings and each first artist painting tile within the group corresponds to a successive one of plurality of areas of the corresponding first artist painting.

24. The computing device of claim 19, wherein each group of multiple artist painting tiles correspond to a successive one of the multiple artist paintings and each multiple artist painting tile within the group corresponds to a successive one of plurality of areas of the corresponding multiple artist painting.

25. A computer-implemented method for utilizing machine learning to authenticate works of art, the method comprising:

receiving a test image data file including image data corresponding to an image of a test painting to be authenticated, the test painting thought to be painted by a first artist;

receiving a plurality of first artist image data files, each first artist image data file including image data corresponding to an image of a successive one of a plurality of first artist paintings, each first artist painting known to be painted by the first artist;

receiving a plurality of multiple artist image data files, each multiple artist image data file including image data corresponding to an image of a successive one of a plurality of multiple artist paintings, each multiple artist painting known to be painted by a successive one of a plurality of different artists;

generating a plurality of test painting tiles from the test image data file, each test painting tile including image data for a first number of pixels;

generating a plurality of groups of first artist painting tiles, each group from a successive one of the first artist image data files, each first artist painting tile including image data for the first number of pixels;

generating a plurality of groups of multiple artist painting tiles, each group from a successive one of the multiple artist image data files, each multiple artist painting tile including image data for the first number of pixels;

generating a plurality of numerical image content descriptors for each test painting tile, each single artist painting tile, and each multiple artist painting tile, the numerical image content descriptors generated by at least one of UDAT and WND-CHARM;

calculating a plurality of distances using a distance-based machine learning algorithm, each distance being a vector distance between the numerical image content descriptors of each test painting tile and the numerical image content descriptors of each first artist painting tile from each group of first artist painting tiles and between the numerical image content descriptors of each test painting tile and the numerical image content descriptors of each multiple artist painting tile from each group of multiple artist painting tiles;

calculating a first artist average distance including an average of the distances between the test painting tiles and the first artist painting tiles;

calculating a plurality of multiple artist average distances, each multiple artist average distance being an average of the distances between the test painting tiles and the multiple artist painting tiles of each group of the multiple artist painting tiles; and determining that the test painting was likely painted by the first artist if the first artist average distance is less than each of the multiple artist average distances.

26. The computer-implemented method of claim 25, further comprising normalizing the test image data file, each first artist image data file, and each multiple artist image data file to include image data for a first number of pixels, such that an aspect ratio of the test painting, each first artist painting, and each multiple artist painting is preserved.

27. The computer-implemented method of claim 25, further comprising executing a plurality of image data analysis algorithms when generating the numerical image content descriptors such that each image data analysis algorithm generates at least a portion of the numerical image content descriptors.

28. The computer-implemented method of claim 25, wherein each test painting tile corresponds to a successive one of plurality of areas of the test painting.

29. The computer-implemented method of claim 25, wherein each group of first artist painting tiles correspond to a successive one of the first artist paintings and each first artist painting tile within the group corresponds to a successive one of plurality of areas of the corresponding first artist painting.

30. The computer-implemented method of claim 25, wherein each group of multiple artist painting tiles correspond to a successive one of the multiple artist paintings and each multiple artist painting tile within the group corresponds to a successive one of plurality of areas of the corresponding multiple artist painting.

* * * * *